(12) United States Patent
Takakura

(10) Patent No.: US 10,458,511 B2
(45) Date of Patent: Oct. 29, 2019

(54) ANTI-VIBRATION DEVICE

(71) Applicant: BRIDGESTONE CORPORATION, Tokyo (JP)

(72) Inventor: Tomoki Takakura, Yokohama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 15/566,829

(22) PCT Filed: Feb. 24, 2016

(86) PCT No.: PCT/JP2016/000991
§ 371 (c)(1),
(2) Date: Oct. 16, 2017

(87) PCT Pub. No.: WO2016/174801
PCT Pub. Date: Nov. 3, 2016

(65) Prior Publication Data
US 2018/0106324 A1 Apr. 19, 2018

(30) Foreign Application Priority Data

Apr. 27, 2015 (JP) .................. 2015-090508

(51) Int. Cl.
*F16F 13/10* (2006.01)
*B60K 5/12* (2006.01)
*F16F 13/00* (2006.01)

(52) U.S. Cl.
CPC .......... *F16F 13/107* (2013.01); *B60K 5/1208* (2013.01); *F16F 13/102* (2013.01);
(Continued)

(58) Field of Classification Search
CPC .... F16F 13/102; F16F 13/107; F16F 2230/06; F16F 13/10; F16F 2226/04; B60K 5/1208
See application file for complete search history.

(56) References Cited

U.S. PATENT DOCUMENTS 5,295,672 A * 3/1994 Gugsch ................. F16F 13/105
267/140.11
5,772,189 A * 6/1998 Satori ..................... F16F 13/10
267/140.13
(Continued)

FOREIGN PATENT DOCUMENTS

CN 1705833 A 12/2005
CN 101548115 A 9/2009
(Continued)

OTHER PUBLICATIONS

International Search Report of PCT/JP2016/000991 dated Mar. 29, 2016 [PCT/ISA/210].
(Continued)

*Primary Examiner* — Melody M Burch
(74) *Attorney, Agent, or Firm* — Sughrue Mion, PLLC

(57) ABSTRACT

An anti-vibration device (1) includes a tubular first attachment member (10), a second attachment member (20), an elastic body (70), and a separating member (50) that separates a liquid chamber in the first attachment member into a main liquid chamber (80) and a secondary liquid chamber (90). A tapered surface (502) decreasing in diameter towards another side in the axial direction is formed on an end on the other side in the axial direction of an outer circumferential surface of the separating member, a bend portion (101) bent to follow the tapered surface is formed on an end on the other side in the axial direction of the first attachment member, and an end (301) on the outer circumferential side of a diaphragm (30) is sandwiched between the tapered surface and the bend portion.

3 Claims, 2 Drawing Sheets

(52) U.S. Cl.
CPC ........... *F16F 13/10* (2013.01); *F16F 2226/04* (2013.01); *F16F 2230/06* (2013.01)

(56) References Cited

U.S. PATENT DOCUMENTS

| | | | | |
|---|---|---|---|---|
| 2002/0000688 | A1* | 1/2002 | Simuttis | F16F 13/10 267/140.13 |
| 2003/0168789 | A1* | 9/2003 | Kries | F16F 13/105 267/140.13 |
| 2006/0267259 | A1 | 11/2006 | Hatakeyama et al. | |
| 2008/0284075 | A1 | 11/2008 | Saito et al. | |
| 2009/0250852 | A1* | 10/2009 | Jones | F16F 13/105 267/140.13 |
| 2010/0072683 | A1 | 3/2010 | Saito et al. | |
| 2010/0187733 | A1 | 7/2010 | Oohashi | |
| 2013/0256960 | A1* | 10/2013 | Marienfeld | F16F 13/10 267/140.14 |
| 2014/0001685 | A1* | 1/2014 | Kim | F16F 13/10 267/140.13 |

FOREIGN PATENT DOCUMENTS

| | | |
|---|---|---|
| CN | 101688582 A | 3/2010 |
| CN | 104154171 A | 11/2014 |
| JP | 10-047424 A | 2/1998 |
| JP | 200239255 A | 2/2002 |
| JP | 2008-051136 A | 3/2008 |
| JP | 2008138855 A | 6/2008 |
| JP | 2009-041761 A | 2/2009 |
| JP | 2009-092137 A | 4/2009 |
| JP | 2009-236289 A | 10/2009 |
| JP | 2013-072465 A | 4/2013 |
| JP | 2013-194848 A | 9/2013 |

OTHER PUBLICATIONS

Written Opinion of PCT/JP2016/000991 dated Mar. 29, 2016 [PCT/ISA/237].
Communication dated Sep. 29, 2018, from the State Intellectual Property Office of People's Republic of China in counterpart Application No. 201680024035.6.
Communication dated Apr. 30, 2019 from the China National Intellectual Property of Administration in counterpart Application No. 201680024035.6.

* cited by examiner

ANTI-VIBRATION DEVICE

CROSS REFERENCE TO RELATED APPLICATIONS

This application is a National Stage of International Application No. PCT/JP2016/000991, filed Feb. 24, 2016, claiming priority based on Japanese Patent Application No. 2015-090508, filed Apr. 27, 2015, the contents of all of which are incorporated herein by reference in their entirety.

TECHNICAL FIELD

The present disclosure relates to a liquid-filled type anti-vibration device used, for example, as an engine mount of a vehicle.

BACKGROUND

One type of conventional anti-vibration device includes a separating member (separating body) that separates a liquid-filled liquid chamber inside a tubular attachment member (second fixture) into a main liquid chamber on one side in the axial direction and a secondary liquid chamber on the other side in the axial direction. An annular metal fitting (reinforcement member) is fixed by vulcanization adhesion to the outer circumferential surface of a diaphragm that partially partitions the secondary liquid chamber, and an end on the other side in the axial direction of the attachment member is fixed to the metal fitting by being bent towards the inner circumferential side (for example, see patent literature PTL 1). As a result, the diaphragm and attachment member are firmly fixed to each other.

CITATION LIST

Patent Literature

PTL 1: JP 2013-194848 A

SUMMARY

Technical Problem

In the anti-vibration device of patent literature PTL 1, however, since the metal fitting is provided on the diaphragm, the material itself for the metal fitting and the step for fixing the metal fitting to the diaphragm by vulcanization adhesion lead to increased costs, and the weight also increases in proportion to the metal fitting.

To address these issues, the metal fitting on the diaphragm could be omitted from the anti-vibration device of patent literature PTL 1. In this case, to fix the diaphragm and the attachment member firmly to each other, the end on the other side in the axial direction of the attachment member needs to be bent towards the inner circumferential side at approximately 90° relative to the axial direction so that the outer circumferential end of the diaphragm is sandwiched by the end face, extending perpendicularly relative to the axial direction, on the other side in the axial direction of the separating member and the end on the other side in the axial direction of the attachment member. When bending the end on the other side in the axial direction of the attachment member towards the inner circumferential side at approximately 90° relative to the axial direction, however, a wrinkle may occur in the bent portion, which is problematic not only in terms of appearance, but which may also cause liquid to leak.

The present disclosure therefore provides an anti-vibration device that can reduce costs and weight by not providing a metal fitting in the diaphragm and that can obtain good sealing properties.

Solution to Problem

An anti-vibration device according to the present disclosure includes a tubular first attachment member configured to be connected to one of a vibration generating portion and a vibration receiving portion, a second attachment member configured to be connected to another one of the vibration generating portion and the vibration receiving portion, an elastic body connecting the first attachment member and the second attachment member to each other, and a separating member separating a liquid-filled liquid chamber inside the first attachment member into a main liquid chamber on one side in an axial direction and a secondary liquid chamber on another side in the axial direction, the main liquid chamber being partitioned by at least the elastic body, and the secondary liquid chamber being partitioned by at least a diaphragm, wherein a tapered surface decreasing in diameter towards the another side in the axial direction is formed on an end on the another side in the axial direction of an outer circumferential surface of the separating member, a bend portion bent to follow the tapered surface is formed on an end on the another side in the axial direction of the first attachment member, and an end on an outer circumferential side of the diaphragm is sandwiched between the tapered surface and the bend portion.

According to the anti-vibration device of this embodiment, costs and weight can be reduced by not providing a metal fitting in the diaphragm, and good sealing properties can be obtained.

In the anti-vibration device of the present disclosure, within the outer circumferential surface of the separating member, a portion adjacent to the tapered surface on the one side in the axial direction may be substantially flush with an end face furthest on the outer circumferential side of the diaphragm.

As a result, the ease of assembly during manufacturing and the sealing properties can be improved.

In the anti-vibration device of the present disclosure, an engaged portion may be formed on the tapered surface of the separating member, and an engaging portion that engages with the engaged portion may be formed on the end on the outer circumferential side of the diaphragm.

As a result, the ease of assembly during manufacturing and the sealing properties can be improved.

In the anti-vibration device of the present disclosure, the engaging portion of the diaphragm may be positioned further on the outer circumferential side than the end on the another side in the axial direction of the first attachment member.

The sealing properties can thus be improved further.

Advantageous Effect

The present disclosure can provide an anti-vibration device that can reduce costs and weight by not providing a metal fitting in the diaphragm and that can obtain good sealing properties.

DETAILED DESCRIPTION

The following illustrates and describes embodiments of the disclosed anti-vibration device with reference to drawings.

Figure 1:
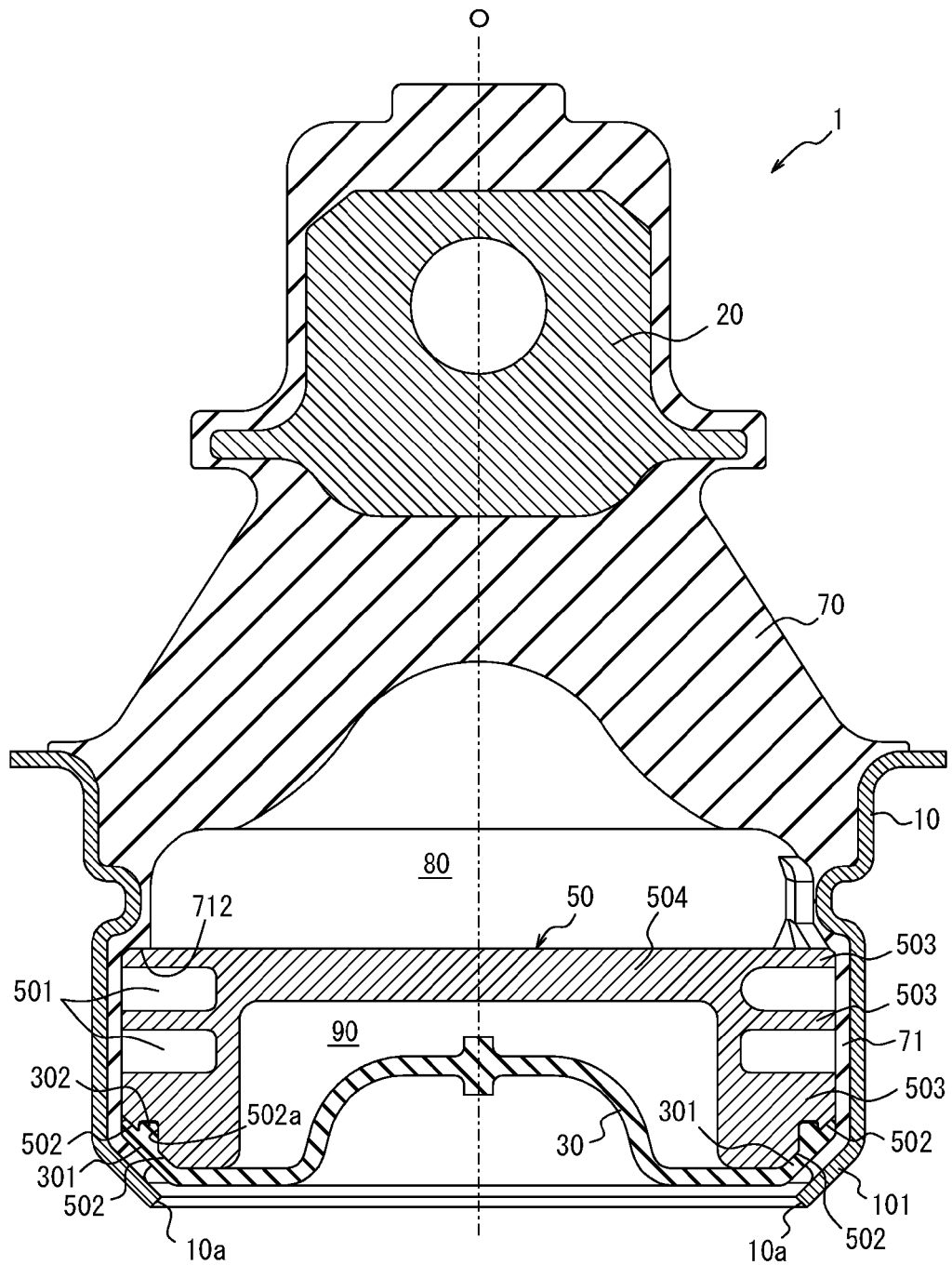
FIG. 1 is a cross-sectional diagram in the axial direction, illustrating an embodiment of an anti-vibration device of the present disclosure.
Figure 2:
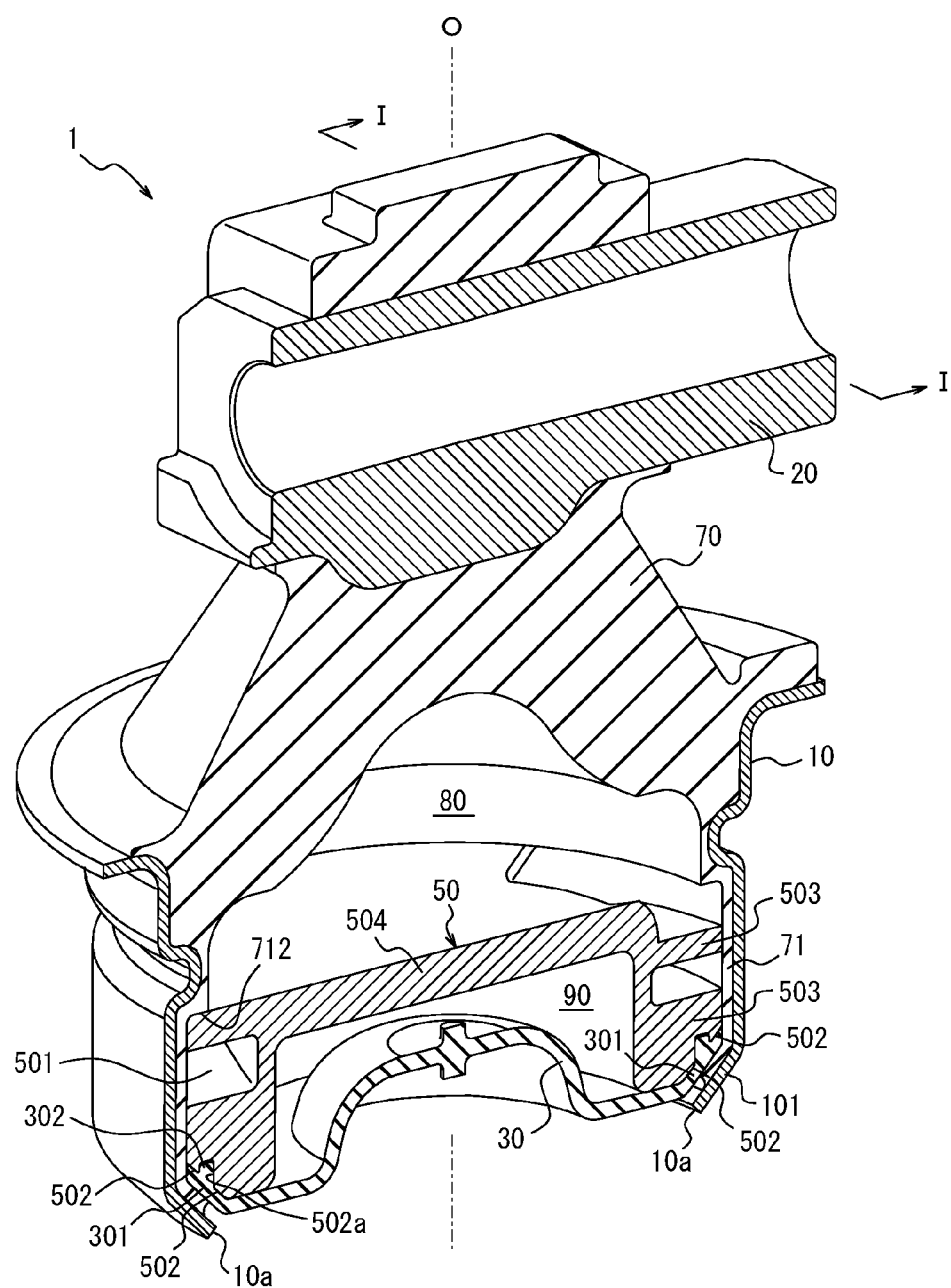
FIG. 2 is a partial cross-sectional perspective view illustrating a portion of the anti-vibration device in FIG. 1 with a cross-section in the axial direction.

FIG. 1 is a cross-sectional diagram in the axial direction of an anti-vibration device 1 according to an embodiment of the present disclosure. FIG. 2 is a partial cross-sectional perspective view illustrating a portion of the anti-vibration device 1 in FIG. 1 with a cross-section in the axial direction. The cross-sectional diagram of FIG. 1 is taken along the I-I line in FIG. 2. The anti-vibration device 1 of this embodiment is configured as a liquid-filled type anti-vibration device and is suitably used as an engine mount of a vehicle or the like. The anti-vibration device 1 of this embodiment is configured to be connected between a vibration generating portion (engine or the like) and a vibration receiving portion (car body or the like) and functions to reduce transmission of vibration from the vibration generating portion to the vibration receiving portion.

The anti-vibration device 1 of this embodiment includes a first attachment member 10 that is tubular (substantially cylindrical in this example) and configured to be connected to one of the vibration generating portion and the vibration receiving portion, a second attachment member 20 configured to be connected to the other one of the vibration generating portion and the vibration receiving portion, an elastic body 70 connecting the first attachment member 10 and the second attachment member 20 to each other, and a separating member 50 that separates a liquid-filled liquid chamber inside the first attachment member 10 into a main liquid chamber 80 and a secondary liquid chamber 90. The main liquid chamber 80 is partitioned by at least the elastic body 70 and is on one side in the axial direction (the upper side in FIG. 1; the same holds below). The secondary liquid chamber 90 is partitioned by at least a diaphragm 30 and is on the other side in the axial direction (the lower side in FIG. 1; the same holds below).

The "axial direction of the anti-vibration device 1" refers to the direction along the central axis O of the first attachment member 10 (and therefore the central axis of the anti-vibration device 1). Furthermore, in the present disclosure, the area closer to the central axis O of the first attachment member 10 is referred to as the "inner circumferential side", and the area further from the central axis O is referred to as the "outer circumferential side".

The separating member 50 and the diaphragm 30 are disposed at the inner circumferential side of the first attachment member 10.

In the example in the figures, the second attachment member 20 is separated from the first attachment member 10 towards the one side in the axial direction. The outer surface of the elastic body 70 is formed as a substantially truncated cone protruding towards the one side in the axial direction, and the inner surface of the elastic body 70 (the surface at the other side in the axial direction) is recessed towards the one side in the axial direction. The elastic body 70 is fixed to a portion of the inner circumferential surface of the first attachment member 10 on the one side in the axial direction. The portion of the inner circumferential surface of the first attachment member 10 on the other side in the axial direction from the portion to which the elastic body 70 is attached is covered by a seal member 71 shaped as a thin film. The elastic body 70 and the seal member 71 are each formed from an elastic material, such as rubber. In this example, the elastic body 70 and the seal member 71 are formed integrally from the same material, but these components may be formed separately and may be formed from different materials.

In this example, a step 712 composed of the surface facing the other side in the axial direction is formed on the seal member 71, and the outer circumferential side end on the surface of the separating member 50 on the one side in the axial direction abuts the step 712.

The separating member 50 is constituted by plastic or another such resin material, aluminum alloy or another such metal, or the like. In the example in the figures, the separating member 50 is formed in the shape of an upside-down cup, with the open end face on the other side in the axial direction, and includes a circumferential wall portion 503 that partially partitions a spiral orifice passage 501 and an upper wall portion 504 that is formed integrally with the circumferential wall portion 503 and that, further on the inner circumferential side than the circumferential wall portion 503, blocks an open side of the circumferential wall portion 503 at the one side in the axial direction.

The end on the other side in the axial direction of the separating member 50 is covered by the diaphragm 30.

In the example in the figures, the diaphragm 30 blocks the open side on the other side in the axial direction of the first attachment member 10, and the inner circumferential portion of the surface on the other side in the axial direction of the diaphragm 30 is exposed to the outside. This example is not limiting, and the open side on the other side in the axial direction of the first attachment member 10 may be blocked by a bottom wall member (not illustrated) formed integrally with or separately from the first attachment member 10, and this bottom wall member may cover the inner circumferential portion of the surface on the other side in the axial direction of the diaphragm 30.

The orifice passage 501 is partitioned by a groove formed on the outer circumferential surface of the separating member 50 and by the seal member 71 that blocks the opening of the groove on the outer circumferential side. The orifice passage 501 connects the main liquid chamber 80 and the secondary liquid chamber 90. The orifice passage 501 includes an opening, at one passage end, on a surface on the one side in the axial direction of the separating member 50 and an opening, at the other passage end, on a surface on the other side in the axial direction of the separating member 50. The orifice passage 501 extends spirally between these openings.

In this example, the main liquid chamber 80 is partitioned by the inner surface of the elastic body 70 (the surface on the other side in the axial direction), the surface on the one side in the axial direction of the separating member 50, and the inner circumferential surface of the seal member 71. The secondary liquid chamber 90 is partitioned by the surface on the other side in the axial direction of the separating member 50 and the surface on the one side in the axial direction of the diaphragm 30.

An incompressible liquid, such as ethylene glycol, water, or silicone oil, is enclosed in the liquid chamber that includes the main liquid chamber 80 and the secondary liquid chamber 90 inside the first attachment member 10.

The diaphragm 30 is made of an elastic material, such as rubber. No metal fitting is provided on the diaphragm 30.

In the anti-vibration device 1 configured in this way, when vibration from the vibration generating portion is input in the axial direction, the first attachment member 10 and the second attachment member 20 are relatively displaced in the axial direction, and while the main liquid chamber 80 and the secondary liquid chamber 90 expand and contract, liquid flows between the main liquid chamber 80 and the secondary liquid chamber 90 through the orifice passage 501. During this time, the vibration is absorbed and damped by elastic deformation of the elastic body 70 and is also absorbed and damped by liquid column resonance and flow path resistance of the liquid flowing through the orifice passage 501.

In this embodiment, a tapered surface 502 that gradually decreases in diameter towards the other side in the axial direction is formed on the end on the other side in the axial direction of the outer circumferential surface of the separating member 50. Furthermore, a bend portion 101 that bends towards the inner circumferential side so as to follow the tapered surface 502 is formed at the end on the other side in the axial direction of the first attachment member 10. The bend portion 101 is substantially parallel to the tapered surface 502 and gradually decreases in diameter towards the other side in the axial direction, like the tapered surface 502. An end 301 on the outer circumferential side of the diaphragm 30 is fixed by being sandwiched between the tapered surface 502 and the bend portion 101 (in greater detail, the inner circumferential surface of the bend portion 101).

The bend portion 101 is formed by bending the end on the other side in the axial direction of the first attachment member 10 from a state of extension in the axial direction towards the inner circumferential side at an angle of less than 90° in a cross-section along the axial direction. Accordingly, the occurrence of wrinkles at the bend portion 101 can be reduced much more than if the bend portion 101 is formed by being bent towards the inner circumferential side at an angle of 90°. As a result, strong sealing properties are ensured between the diaphragm 30 and the first attachment member 10, and liquid can be prevented from leaking. A good external appearance can also be obtained.

In this way, according to the anti-vibration device 1 of this embodiment, costs and weight can be reduced by not providing a metal fitting in the diaphragm 30, and good sealing properties can be obtained.

In forming the bend portion 101, the angle at which the end on the other side in the axial direction of the first attachment member 10 is bent from a state of extension in the axial direction towards the inner circumferential side, i.e. the angle of the bend portion 101 relative to the axial direction, is preferably from 30° to 60° in a cross-section along the axial direction. By setting this angle to 30° or greater, the end 301 on the outer circumferential side of the diaphragm 30 can be sandwiched more firmly between the tapered surface 502 and the bend portion 101, thereby obtaining sufficient sealing properties. On the other hand, setting this angle to 60° or less sufficiently reduces the occurrence of wrinkles in the bend portion 101 and yields sufficient sealing properties and a good external appearance. For the same reasons, this angle is more preferably from 40° to 50°.

In this example, the seal member 71 is disposed between the end 301 on the outer circumferential side of the diaphragm 30 and the bend portion 101. The surface on the one side in the axial direction of the end 301 on the outer circumferential side of the diaphragm 30 abuts the tapered surface 502, and the surface on the other side in the axial direction of the end 301 on the outer circumferential side of the diaphragm 30 abuts the inner circumferential surface of the seal member 71. However, the seal member 71 may be omitted from between the end 301 on the outer circumferential side of the diaphragm 30 and the bend portion 101. In this case, the surface on the one side in the axial direction of the end 301 on the outer circumferential side of the diaphragm 30 abuts the tapered surface 502, and the surface on the other side in the axial direction of the end 301 on the outer circumferential side of the diaphragm 30 abuts the inner circumferential surface of the bend portion 101.

In this example, an engaged portion 502a configured by an annular recess extending across the entire circumference around the central axis O is formed on the tapered surface 502 of the separating member 50. Furthermore, an engaging portion 302 configured by an annular protrusion extending across the entire circumference around the central axis O is formed on the end on the outer circumferential side of the diaphragm 30 so as to engage with the engaged portion 502a. In this example, the engaging portion 302 is fit into the engaged portion 502a. With this configuration, the diaphragm 30 can be mounted more firmly on the separating member 50, and the sealing properties can be improved, as compared to if the engaged portion 502a and the engaging portion 302 are not provided. Furthermore, the diaphragm 30 can be mounted more easily on a predetermined position of the separating member 50 during manufacturing of the anti-vibration device 1, improving ease of assembly.

When manufacturing the anti-vibration device 1 of this embodiment, for example, the first attachment member 10, second attachment member 20, elastic body 70, and seal member 71 are first integrally fixed to each other by vulcanization adhesion. At this time, the end on the other side in the axial direction of the first attachment member 10 extends in the axial direction. The separating member 50 is then inserted inside the first attachment member 10 from the other side in the axial direction and is abutted against the step 712 formed on the seal member 71. The diaphragm 30 is mounted on the separating member 50 by engaging the engaging portion 302 of the diaphragm 30 with the engaged portion 502a of the separating member 50 before or after inserting the separating member 50 into the first attachment member 10. Subsequently, the first attachment member 10 is squeezed from the outer circumferential side to be reduced in diameter, and the bend portion 101 is formed by bending the end on the other side in the axial direction of the first attachment member 10 towards the inner circumferential side at an angle of less than 90° so as to be substantially parallel to the tapered surface 502. As a result, the end 301 on the outer circumferential side of the diaphragm 30 is fixed by being sandwiched between the tapered surface 502 and the bend portion 101 (in greater detail, the inner circumferential surface of the bend portion 101).

The engaged portion 502a and the engaging portion 302 may have a different configuration from this example as long as these portions can engage with each other.

For example, the engaged portion 502a and the engaging portion 302 extend along the axial direction in this example, but this configuration is not limiting. These portions may extend in any direction, such as a direction substantially perpendicular to the tapered surface 502 or a direction towards the inner circumferential side. Having the engaged portion 502a and the engaging portion 302 extend along the axial direction as in this example, however, is preferable in that during manufacturing, the engaged portion 502a and the engaging portion 302 easily engage when the diaphragm 30 is mounted on the separating member 50.

The engaged portion 502a and the engaging portion 302 may also be configured to be discontinuous in the circumferential direction.

Furthermore, the engaged portion 502a may be configured as a protrusion, and the engaging portion 302 as a recess.

In this example, the engaging portion 302 of the diaphragm 30 is positioned further on the outer circumferential side than the end 10a on the other side in the axial direction of the first attachment member 10. With this configuration, the diaphragm 30 can be fixed between the tapered surface 502 and the bend portion 101 more firmly, and sealing properties can be improved, as compared to if the engaging portion 302 is positioned further on the inner circumferential side than the end 10a on the other side in the axial direction of the first attachment member 10.

In this example, within the outer circumferential surface of the separating member 50, the portion adjacent to the tapered surface 502 on the one side in the axial direction is substantially flush with the end face furthest on the outer circumferential side of the diaphragm 30. In other words, the outer diameter of the portion, within the separating member 50, that is adjacent to the tapered surface 502 on the one side in the axial direction is substantially the same as the outer diameter of the diaphragm 30. As a result, for example when inserting the diaphragm 30 and the separating member 50 together into the first attachment member 10 after mounting the diaphragm 30 on the separating member 50 during manufacturing of the anti-vibration device 1, the insertion operation is easier than if, within the outer circumferential surface of the separating member 50, the portion adjacent to the tapered surface 502 on the one side in the axial direction is not flush with the end face furthest on the outer circumferential side of the diaphragm 30. Furthermore, for example when mounting the diaphragm 30 on the separating member 50 after inserting the separating member 50 in the first attachment member 10, the mounting operation is easier. The ease of assembly can thus be improved. The sealing properties of the anti-vibration device 1 can also be improved.

Apart from the above-described examples, a variety of modifications may be made to the anti-vibration device 1.

For example, the first attachment member 10 may be constituted by a plurality of coaxial tubular members.

A second orifice passage may also be formed at an inner circumferential portion of the separating member 50. In this case, a storage chamber connecting to the second orifice passage may be formed in the separating member 50, and a movable plate (membrane) may be stored in the storage chamber. Alternatively, without forming a second orifice passage, the outer circumferential portion of a movable plate may be configured to be held by the separating member 50.

REFERENCE SIGNS LIST

1 Anti-vibration device
10 First attachment member
10a End on other side in axial direction of first attachment member
20 Second attachment member
30 Diaphragm
50 Separating member
70 Elastic body
71 Seal member
80 Main liquid chamber
90 Secondary liquid chamber
101 Bend portion
301 End on outer circumferential side of diaphragm
302 Engaging portion
501 Orifice passage
502 Tapered surface
502a Engaged portion
503 Circumferential wall portion
504 Upper wall portion
712 Step
O Central axis

The invention claimed is:

1. An anti-vibration device comprising:
a tubular first attachment member configured to be connected to one of a vibration generating portion and a vibration receiving portion;
a second attachment member configured to be connected to another one of the vibration generating portion and the vibration receiving portion;
an elastic body connecting the first attachment member and the second attachment member to each other; and
a separating member separating a liquid-filled liquid chamber inside the first attachment member into a main liquid chamber on one side in an axial direction and a secondary liquid chamber on another side in the axial direction, at least a portion of the main liquid chamber being enclosed by the elastic body, and at least a portion of the secondary liquid chamber being enclosed by a diaphragm, wherein:
a tapered surface decreasing in diameter towards the another side in the axial direction is formed on an end on the another side in the axial direction of an outermost circumferential surface of the separating member,
a bend portion bent to follow the tapered surface is formed on an end on the another side in the axial direction of the first attachment member, and
an end on an outer circumferential side of the diaphragm is sandwiched between the tapered surface and the bend portion,
wherein:
the separating member includes an engaged portion formed on the tapered surface of the separating member, and
the diaphragm includes an engaging portion, which engages with the engaged portion, formed on the end on the outer circumferential side of the diaphragm, and
wherein the engaged portion is located between an outer circumferential end of the tapered surface and an inner circumferential end of the tapered surface.

2. The anti-vibration device of claim 1, wherein within the outermost circumferential surface of the separating member, a portion adjacent to the tapered surface on the one side in the axial direction is substantially flush with an end face furthest on the outer circumferential side of the diaphragm.

3. The anti-vibration device of claim 1, wherein the engaging portion of the diaphragm is positioned further on the outer circumferential side than the end on the another side in the axial direction of the first attachment member.

* * * * *